Nov. 23, 1926.
M. L. MARTUS ET AL
1,608,108
ELECTRIC CONTROL SWITCH
Filed March 15, 1923     3 Sheets-Sheet 1
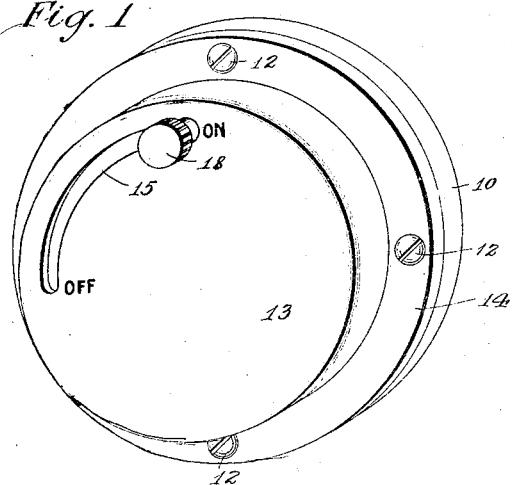
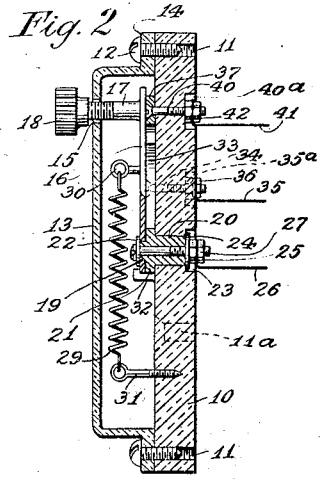
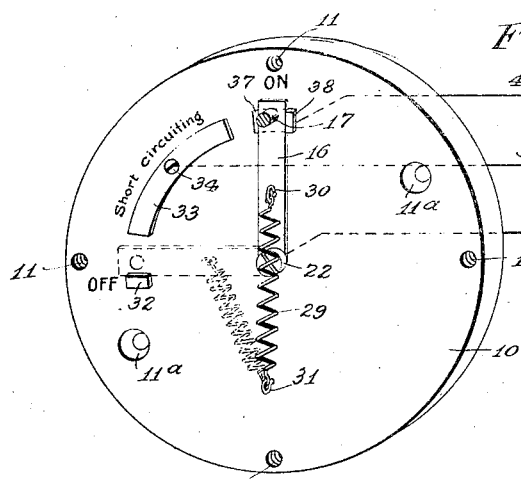
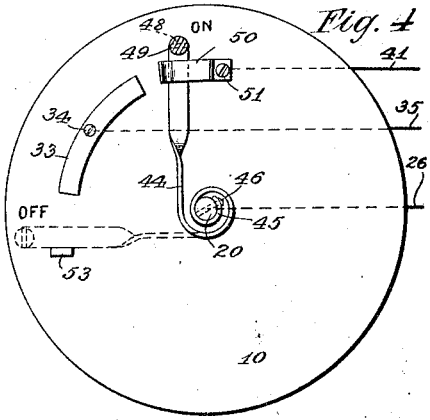
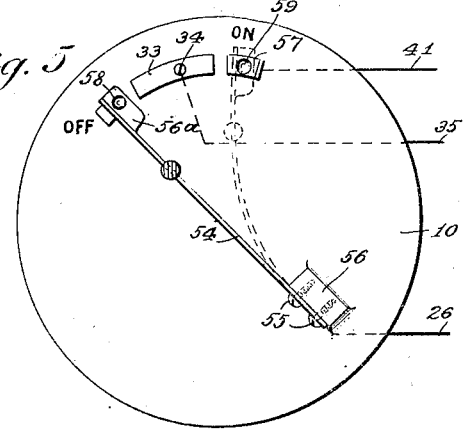
INVENTORS.
Martin L. Martus,
Edmund H. Becker and
James G. Ross
BY H. G. Manning
ATTORNEY Nov. 23, 1926.  
M. L. MARTUS ET AL  
1,608,108  
ELECTRIC CONTROL SWITCH  
Filed March 15, 1923   3 Sheets-Sheet 2
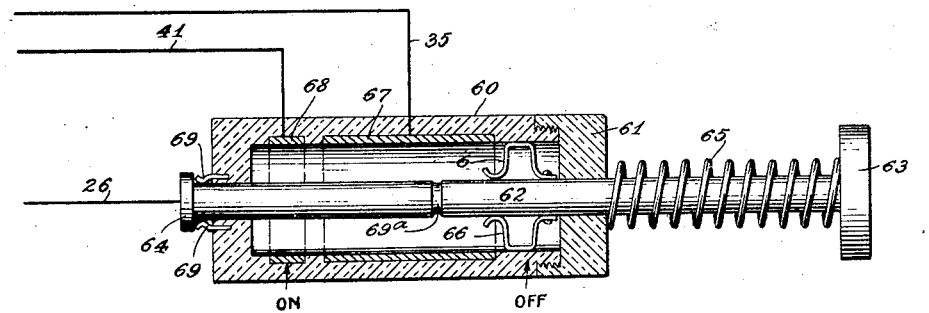
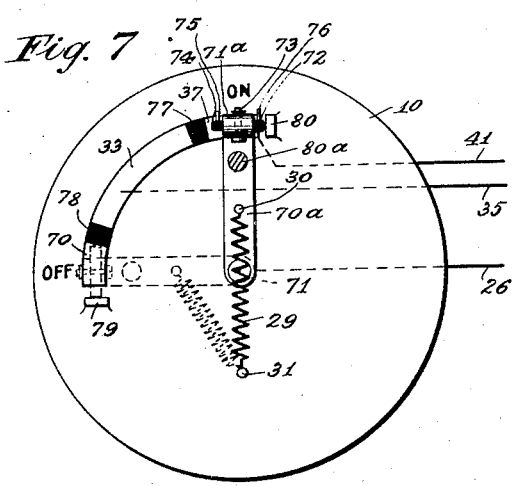
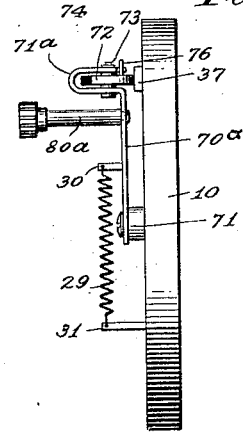
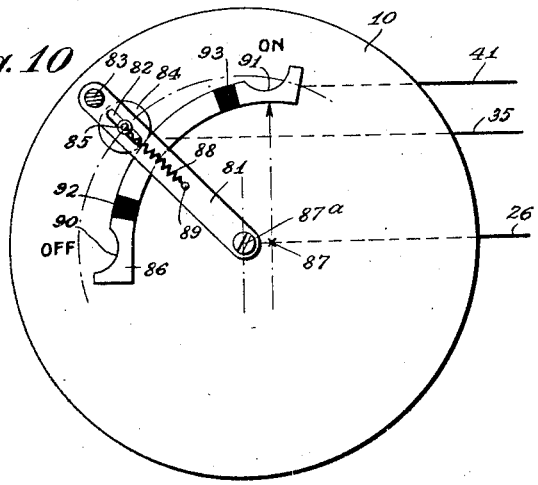
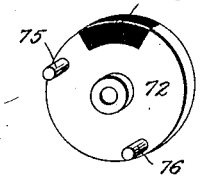
INVENTORS  
Martin L. Martus,  
Edmund H. Becker and  
James G. Ross  
BY H. G. Manning  
ATTORNEY Nov. 23, 1926.
M. L. MARTUS ET AL
1,608,108
ELECTRIC CONTROL SWITCH
Filed March 15, 1923    3 Sheets-Sheet 3
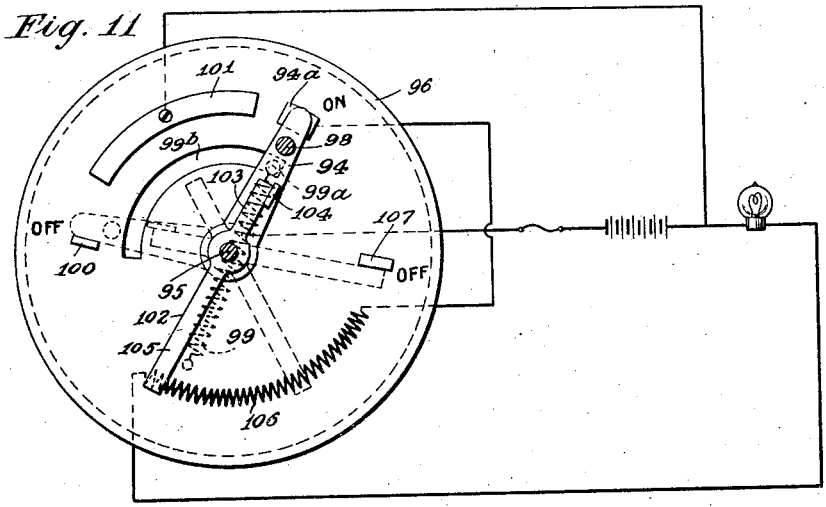
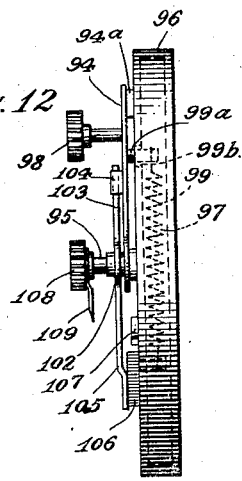
INVENTOR.
Martin L. Martus,
Edmund H. Becker and
James G. Ross
BY H. G. Manning
ATTORNEY Patented Nov. 23, 1926.

1,608,108

UNITED STATES PATENT OFFICE.

MARTIN L. MARTUS, OF WOODBURY, AND EDMUND H. BECKER AND JAMES G. ROSS, OF WATERBURY, CONNECTICUT.

ELECTRIC CONTROL SWITCH.

Application filed March 15, 1923. Serial No. 625,215.

This invention relates to electric switches, and more particularly to an improved form of control switch for a lamp filament circuit, the current of which is supplied by a primary battery.

One object of this invention is to provide a control switch of the above nature which will cause the primary battery to be short-circuited for a brief period immediately before it is connected into the filament circuit, whereby the initial excess "peak" voltage of said battery will be eliminated.

A further object is to provide a control switch of the above nature having means to prevent the short-circuiting of the battery while the switch is being opened.

A further object is to provide a control switch of the above nature which will be simple, fool-proof, cheap to manufacture, easy to manipulate, and very efficient, reliable, and durable in use.

With these and other objects in view, there have been illustrated on the accompanying drawing several forms in which the invention may be conveniently embodied in practice.

Fig. 1 represents an exterior perspective view of one form of filament control switch embodying the invention.

Fig. 2 is a side sectional view of the control switch shown in Fig. 1.

Fig. 3 is a perspective view of the control switch shown in Figs. 1 and 2, with the protecting cover removed and showing a diagram of the electrical circuit controlled by said switch.

Fig. 4 is a plan view of a modified form of control switch.

Fig. 5 is a plan view of another modified form of control switch.

Fig. 6 is a sectional view of another modified form of the invention, in which the switch is of the plunger type.

Figs. 7 and 8 are plan and side views, respectively, of another modified form of control switch in which provision is made to prevent short-circuiting of the battery when the switch is being opened.

Fig. 9 is a detailed perspective view of the contact wheel shown in Figs. 7 and 8.

Fig. 10 is a plan view of another modified form of the invention.

Fig. 11 is a plan view of a still further modified form of the invention in which a filament rheostat is combined with the control switch.

Fig. 12 is a side view of the control switch shown in Fig. 11.

In radio apparatus as heretofore constructed, it has been customary to supply the filament current from a storage battery. Such batteries, however, are objectionable on account of their high initial cost, and also because they have to be frequently recharged. In order to avoid these difficulties, attempts have been made to employ primary batteries for operating the filament circuits of radio sets. Ordinary dry cells have been thus used to some extent, but as such cells rapidly polarize on closed circuit and suffer a steady drop in voltage, they have proven unsatisfactory.

The best results have been obtained with closed-circuit primary batteries which generate electricity at practically constant voltage for an indefinite period of time. It has been found, however, that when such a closed-circuit primary battery was used as the "A" battery of a radio set, the filament would often be injured or burned out by the excessive initial "peak" voltage of said battery, which in some cases was 80% greater than the operating closed-circuit voltage. According to the present invention, the above and other disadvantages have been avoided.

This has been accomplished by providing an improved form of control switch adapted to automatically short-circuit the battery momentarily just prior to the closing of the switch, in order to eliminate or reduce the excess initial "peak" voltage and thereby prevent injury to the vacuum tube filaments.

Referring now to the drawings, in which like reference numerals denote corresponding parts throughout the several views, the first embodiment of the invention shown in Figs. 1 to 3, comprises a circular base 10 of any suitable insulating material such as slate, condensite, wood or the like. The base 10 is provided with a series of threaded holes 11 near its periphery, four in number in this instance, said holes being adapted to receive screws 12, by means of which a cover 13 may be secured upon the base. A pair of screw holes 11ᵃ are also provided to receive screws, not shown, for attaching the base 10 to a panel or other support. The cover 13 is preferably cup-shaped and has an annular flange 14 of the same diameter as the base 10, said flange being adapted to lie flat against said base. The upper portion of the cover has a circular slot 15 extending about 90 degrees of arc. Provision is made of a pivotally mounted metallic wiper arm 16 having an upstanding rod 17 secured thereto adjacent its outer end, said rod 17 extending up through the slot 15 and having a hand knob 18 threaded thereon at a point outside of said cover 13.

The inner end of the wiper arm 16 is apertured to fit around a reduced upper shoulder section 19 of a metallic center post 20, and is secured against a flange 21 of said post by means of a screw washer 22 passing through the hollow center of said post 20.

The center post 20 is fitted within a circular aperture in the base 10, said aperture being enlarged or counterbored at 23 to receive a washer 24 and a locking nut 25. As is clearly shown in Figs. 2 and 3, an electrical conductor 26 is connected to said center post 20 by means of a binding nut 27, threaded upon said post beyond the nut 25, said conductor 26 leading to one terminal of a primary battery 28 preferably comprising a series of cells of the well known zinc-copper oxide caustic soda type.

A spiral tension spring 29 is connected to a hook 30 on the wiper arm and to a hook 31 on the base 10, the hook 31 being situated at a point a little to the right of the extended center line of the wiper arm when in closed position, as viewed in Fig. 3. By means of this construction, it will be seen that the wiper arm will be positively held either in its closed (or "on" position as shown in full lines in Fig. 3) or in its open (or "off" position as shown in dotted lines). A stop 32, preferably of insulating material, is mounted on the base 10 to engage the wiper arm 16 in the "off" position shown in Fig. 3.

In order to cause the battery 28 to be temporarily short-circuited, during the throwing of the switch from "off" to "on" position, a metallic short-circuiting sector 33 is mounted on said base, concentrically with the center post 20, and is adapted to be engaged by said wiper arm 16. The sector 33 has a central aperture, and is secured to the base 10 by a machine screw 34 which fits within said aperture and extends down through the base 10, the lower end of said screw 34 being provided with a pair of nuts 36 which serve to hold said screw within a counterbored aperture 35$^a$ of the base. The nuts 36 also serve as a connection for a conducting wire 35. Spaced from the upper end of the sector 33, by a distance slightly less than the width of the wiper arm 16, is a short contact strip 37 having an upturned end 38 which forms a stop for the wiper arm when the latter is in its closed or "on" position.

In order to conduct the current to one terminal of a filament 39 of the radio circuit, the contact strip 37 is apertured and provided with a machine screw 40 passing down through the base 10. The screw 40 is connected to a conducting wire 41 by means of a pair of locking nuts 42, 42 seated within a counterbored recess 40$^a$. The other terminal of said filament 39 is electrically connected to the terminal of the battery 28 opposite from that to which the conductor 26 is connected. The conductor 35 previously mentioned is connected to the filament circuit between the filament 39 and the battery 28, as clearly shown in Fig. 3. It will be evident, therefore, that when the wiper arm 16 is in contact with the sector 33, the battery will be short-circuited through the switch. Adjustable resistances 43 and 43$^a$ are also provided, so as to permit the short-circuiting current and operating current to be readily controlled.

The modified forms of control switch shown in Figs. 4 and 5 differ from the switch of Figs. 1 to 3 only in the construction of the wiper arm and the means for holding the wiper arm in closed position.

In Fig. 4, a slightly modified form of control switch is disclosed. In this form, the wiper arm comprises a metal strip 44 having its inner end 45 bent in the shape of a spiral and secured to the center post 20 by means of a rivet 46. The spiral portion of the metal strip takes the place of the spring 29, of the embodiment illustrated in Figs. 1 to 3. The outer end of the strip 44 is twisted into parallelism with the base 10, and has its extremity upturned at 48, said upturned end 48 being provided with a handle 49 extending through the slot of the cover, which is similar to the cover employed in Figs. 1 to 3. The wiper arm 44 is adapted to be held in the "on" position by means of a resilient clip or catch 50 secured to the base 10 by a screw 51, said screw 51 extending through and being connected at the rear of the base to the conductor 41. The free terminal 52 of the clip 50 is bent upwardly and then downwardly into the shape of a V, so as to engage over the edge of the end of the wiper arm 44. A stop 53 is provided beyond the end of the short-circuiting sector 33 in order to limit the movement of the wiper arm.

In the modified form of control switch shown in Fig. 5, the wiper arm 54 is straight throughout its length, and is secured at its rear end by means of a pair of screws 55 to a metallic block 56 mounted on the base 10, said block 56 being connected to the battery 28 by means of the conductor 26. The forward end of the wiper arm 54 is provided with a side flange 56ª parallel to the base and adapted to engage the short-circuiting contact 33 and a contact strip 57. The flange 56ª is depressed at 58 to form a lug adapted to snap into a catch or depression 59 on the contact 57, when the switch is in closed position. By means of this construction, the wiper arm 54 will be held in "on" position, as long as may be desired.

In the operation of either of the first three illustrated embodiments of the invention, when it is desired to close the switch, the operator will grasp the handle and move it from the "off" to the "on" position. During this operation, the wiper arm will pass successively over the relatively long contact sector 33, thereby short-circuiting the battery 28 momentarily, but sufficiently long to reduce the excess initial peak voltage to a safe point, the duration of said short-circuit being dependent upon the length of said sector 33 and the speed of operating the switch. In each embodiment, the width of the wiper arm is preferably made greater than the width of the space between the short-circuiting contact and the main circuit contact, so that the battery will be thrown directly into the filament circuit without allowing any time interval within which the battery might partially recuperate.

When it is desired to open the circuit, it will merely be necessary for the operator to give the handle a slight push in a counter-clockwise direction until the tension of the spring becomes effective to rapidly force the wiper arm automatically to "off" position. In the device illustrated in Figs. 1 to 3, this will occur when the wiper arm has passed the "dead point", while in the devices shown in Figs. 4 and 5, the same action will occur when the wiper arm has been released from the catches 50 and 57 respectively.

In the modified form of the invention shown in Fig. 6, the control switch consists of a cup-shaped casing 60 having a cap 61 threaded thereon at its open end. The casing 60 and cap 61 are preferably formed of insulating material, and are provided with alined apertures in their ends within which a metallic plunger 62 is adapted to slide. The plunger 62 is provided at one end with an enlarged cylindrical hand knob 63 and at its other end with a somewhat smaller cylindrical flange 64 which serves as a stop to limit the inward movement of said plunger 62. A spiral compression spring 65 is mounted on the plunger between the cap 61 and the knob 63, and tends to force the plunger to the right as viewed in Fig. 6. A pair of resilient S-shaped metallic clips 66 are riveted to opposite sides of the plunger about midway between the ends thereof, said clips 66 being adapted to press outwardly against the inner surface of the casing 60. A pair of tubular metallic rings 67 and 68 are mounted in the casing 60 with their inner surfaces flush with the inner surface of said casing, the ring 67 being relatively long compared with the ring 68. The rings 67 and 68, and the stop flange 64 are connected in any suitable manner as by connecting screws and nuts, to the conducting wires 35, 41, and 26 respectively.

In order to hold the switch shown in Fig. 6 in closed position, a pair of inwardly directed resilient clips 69 extend outwardly from the base of the casing, and are adapted to press inwardly upon the plunger 62 so as to engage within a groove or neck 69ª formed in said plunger. When it is desired to close the switch, the operator will grasp the hand knob 63 and push the plunger 62 to the left. During this movement, the resilient clips 66 will pass rapidly over the short-circuiting ring 67, and will then engage the circuit-closing ring 68. The resilient clips 69 will then snap into the groove 69ª, holding the plunger to the left and causing the current to flow continuously through the filament circuit as long as may be desired. To open the circuit, it is merely necessary to push the stop flange 64 or the hand knob 63 a short distance to the right until the spring 65 overcomes the friction between the clips 69 and the groove 69ª. The switch will then fly open automatically under the influence of the spring 65 to the position shown in Fig. 6.

In Figs. 7, 8, and 9, a modified form of control switch is disclosed having means to prevent short-circuiting of the battery when the switch is being opened. In this embodiment of the invention, the base 10, the short-circuiting sector 33, and the filament contact 37 are made identical with the corresponding parts in the first three above described forms. In this form, however, a strip 70 is provided at the lower end of the contact sector upon which the wiper arm 70ª is adapted to rest when in "off" or open-circuit position. The wiper arm 70ª is pivotally mounted upon a cylindrical sleeve member 71, being thereby spaced from the base 10. The free end 71ª of the wiper arm is bent upwardly and downwardly into the form of a U-bend, and a wheel 72 is mounted on a pin 73 journaled in the side arms of said U-bend, as clearly shown in Figs. 7 and 8. The wheel 72 has an insulating sector 74 upon a portion of its circumference, and the outer face of said wheel 72 is provided with a pair of pins 75 and 76, which are adapted to engage the outer arm of the U-bend 71ª so as to limit the rotation of said wheel in both directions.

An insulating insert 77 is located between the contact members 33 and 37, and a second insulating insert 78 is located between the contact member 33 and the strip 70, so as to form a smooth continuous surface upon which the wheel 72 is adapted to travel. A pair of stops 79 and 80 are also mounted on said base, beyond the ends of the strip 70 and contact 37. An operating handle 80ª is mounted on the intermediate portion of the wiper arm 70ª, and is adapted to extend through the slot of the cover, as in the first illustrated embodiment.

In the operation of the form of the invention shown in Figs. 7 to 9, when the handle 80ª is moved in a clockwise direction to close the switch, the wheel 72 will roll in a clockwise direction. The insulating sector 74 of said wheel will then move upwardly away from the base 10, until the pins 75 and 76 strike opposite edges of the downturned outer end of the wiper arm 70ª. Upon further rotation of the wiper arm, the wheel 72 will be prevented from rotating and will merely slide, with its metallic portion successively engaging the short-circuiting sector 33, the insert 77, and the circuit closing contact 37. When it is desired to open the switch, the wiper arm 70ª will be rotated in a counter-clockwise direction, causing the wheel 72 to roll in the same direction until the pins 75 and 76 again strike the edges of the downturned end of the wiper arm 70ª. The insulating sector 74 will be held by said pins in engagement with the contact section of the base 10. The wiper arm will then slide over the sector 33 without short-circuiting the battery, thus conserving the life thereof.

A further modification of the invention is illustrated in Fig. 10. In this form, the control switch has a wiper arm 81 provided with a slot 82 and a handle 83. Provision is made of a circular roller disk 84 having a central pin 85 projecting from one side and extending through said slot 82, this construction permitting the disk 84 to move longitudinally upon the wiper arm 81, and to roll upon a raised contact sector 86 eccentrically arranged with respect to the circular path of the wiper arm, whose center 87 is spaced slightly from the pivot screw 87ª of said wiper arm. In order to continuously press said roller disk 84 upon the contact sector 86, a spring 88 is carried by the wiper arm, said spring being connected to the central pin 85 of said roller disk, and to a lug 89 near the midpoint of said wiper arm. The wiper arm 81 is prevented from riding over the extremities of the contact sector 86 by a pair of end socket members 90 and 91 having their ends extending outwardly to form stops. The short-circuiting member 33 has its ends spaced from the socket members 90 and 91 by a pair of insulating inserts 92 and 93, said inserts lying flush with the circumference of the sector 86, whereby the wiper arm will make good contact therewith at all points of its travel. In operation, when the wiper arm 81 is released from the socket 91, the action of the spring 88 and the eccentricity of the contact section 86 will cause the wiper arm to move automatically to the "off" position.

A still further modified form of the invention is illustrated in Figs. 11 and 12. In this form, the control switch is combined with a filament rheostat in such a manner that when the switch is opened, the resistance of the rheostat will be automatically thrown completely into the circuit. This will prevent danger of accidentally closing the switch when the amount of resistance in the circuit is insufficient to protect the filament of the lamp. The wiper arm 94 is pivotally mounted on a central post 95 secured to the circular base or support 96. The wiper arm 94 is provided with a handle 98 by means of which it may be manipulated. The wiper also has a spiral tensioned spring 99 located in a hollow cavity 97, said spring being connected to a pin 99ª depending from the wiper, said pin being adapted to move in a slot 99ᵇ, said spring being similar to the spring 29 shown in Figs. 2 and 3. The operation of the wiper arm 94 is identical with that of the wiper 16 shown in Figs. 2 and 3, the wiper being held by the stop 100 when in its "off" position. A short-circuiting sector 101 is located between the contact 94ª and the stop 100, and is similar to the corresponding sectors previously described. Loosely mounted on the post 95 and spaced from the arm 94 is a double-armed lever 102, one arm 103 of which is adapted to be engaged by a lug 104 projecting upwardly from the wiper arm 94. The other arm 105 which is longer than the arm 103, has its outer extremity slightly depressed to contact with the rheostat 106, and is adapted to engage a stop 107 when the resistance is completely introduced into the circuit, said rheostat comprising a sector of coiled wire. Provision is made of a knob 108 rigidly connected to said lever 102 whereby the resistance in the circuit may be increased or diminished at will after the circuit has been closed. The knob 108 is preferably provided with an indicating pointer 109.

In operation, assuming the switch is in closed position, when it is desired to open it, the wiper arm 94 will be pushed sufficiently so that it will automatically swing to the "off" position under the influence of the spring 99. During this operation, the lug 104 on the wiper arm will push the rheostat lever ahead of it to the dotted position shown in Fig. 11, thereby introducing into the circuit all of the resistance of the filament-protecting rheostat 106. When the operator desires to use the instrument again, he will first close the main switch by rotating the wiper arm 94 from the dotted to the full line position. During this operation, the rheostat-engaging arm 105 will remain at its extreme right-hand position in contact with the stop 107. The operator may then rotate the arm 105 by means of the knob 108 until the resistance of the rheostat has been reduced to the desired point.

While the control switches herein disclosed are especially adapted for use in the protection of the filaments of vacuum tube audion bulbs, radiatrons, etc., against the excess initial peak voltages of primary batteries, they may also be employed for protecting any other form of electric filament lamps, such as those used for railway signals, flash-lights, and other lamps for illuminating purposes. It may also be employed in any other circuit where an excess voltage would be injurious.

It will also be understood that while the control switches herein illustrated are manually operated, it is within the general spirit and scope of the invention to provide control switches which are mechanically or electrically operated.

While there have been disclosed in this specification several forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a control switch for a primary battery operated lamp filament circuit, a lamp circuit-closing member, and contact means in the path of said circuit-closing member for momentarily short-circuiting the battery immediately prior to the closing of the circuit through said filament.

2. In a control switch for a lamp filament circuit operated by a primary battery having an initial open circuit peak voltage adapted to rapidly diminish to normal when short-circuited, a movable circuit-closing and opening member, and contact means in the path of said member for temporarily short-circuiting said battery immediately prior to the closing of the circuit through said filament, whereby the open circuit peak voltage of said battery will be reduced before the operating voltage is applied to said lamp.

3. In a control switch for an electrical circuit operated by a battery having a high initial peak voltage adapted to diminish rapidly to normal when current is drawn from said battery, a base member having two contacts mounted thereon, said contacts comprising a battery short-circuiting contact and a circuit-closing contact, and a movable contact member for successively engaging said contacts respectively.

4. In a control switch for an electrical circuit operated by a battery having a high initial peak voltage adapted to diminish rapidly to normal when current is drawn from said battery, a base member having two contacts mounted thereon, said contacts comprising a battery short-circuiting contact and a circuit-closing contact, and means for successively engaging said contacts respectively.

5. In a control switch for an electrical circuit operated by a battery having a high initial peak voltage adapted to diminish rapidly to normal when current is drawn from said battery, a base member having a circuit-closing member mounted thereon, and means in the path of said circuit-closing member for temporarily short-circuiting the battery immediately prior to the closing of said electrical circuit.

6. In a control switch for an electrical circuit operated by a battery having a high initial peak voltage adapted to diminish rapidly to normal when current is drawn from said battery, an insulating base, a pair of arc shaped contacts on said base, a pivoted spring actuated wiper arm adapted to swing over said contacts in succession, one of said contacts causing the battery to be short-circuited when engaged by said wiper arm and the other contact causing the circuit to be closed when so engaged.

7. In a control switch for an electrical circuit operated by a battery having a high initial peak voltage adapted to diminish rapidly to normal when current is drawn from said battery, an insulating base, a pair of arc-shaped contacts on said base, a wiper arm pivoted on said base and mounted to swing over said contacts in succession, a spring for forcing said wiper arm from closed to open position, said battery being temporarily short-circuited when the wiper arm engages one of said contacts, and the circuit being closed when the wiper arm engages the other contact.

8. In a control switch for an electrical circuit operated by a battery having a high initial peak voltage adapted to diminish rapidly to normal when current is drawn from said battery, an insulating base, a pair of arc-shaped contacts on said base, a wiper arm pivoted on said base and mounted to swing over said contacts in succession, a spring for forcing said wiper arm from closed to open position, said battery being temporarily short-circuited when the wiper arm engages one of said contacts, and the circuit being closed when the wiper arm engages the other contact, said short-circuiting contact being substantially longer than said circuit-closing contact.

9. In a control switch for an electrical circuit operated by a battery having a high initial peak voltage adapted to diminish rapidly to normal when current is drawn from said battery, an insulating base, a wiper arm pivoted on said base, an elongated battery short-circuiting contact, a circuit-closing contact, and spring means connected to said wiper arm to cause said arm to move rapidly into open position after it has been released from closed position, said spring being so positioned as to positively hold the wiper arm either in closed or open position.

10. In a control switch for an electrical circuit operated by a source of current having an initial peak voltage adapted to diminish rapidly to normal when current is drawn from said source, a rheostat, a movable circuit-closing member, means operated by the movement of said circuit-closing member to temporarily short-circuit said source of current immediately prior to the closing of the circuit, and means for introducing said rheostat into the circuit when said circuit-closing member is being moved to open position.

11. In a control switch for an electrical circuit operated by a source of current having an initial peak voltage adapted to diminish rapidly to normal when current is drawn from said source, a circuit closing member, means for rapidly reducing the voltage of said source of current immediately prior to the closing of the circuit, and means for automatically introducing a resistance into said circuit after said circuit has been opened.

12. In a control switch for an electrical circuit operated by a battery having a high initial peak voltage adapted to diminish rapidly to normal when current is drawn from said battery, a base member having a circuit-closing member mounted thereon, and means in the path of said circuit-closing member for temporarily short-circuiting the battery immediately prior to the closing of said electrical circuit, a rheostat in said circuit, and a controlling member for said rheostat, said controlling member being actuated by said circuit-closing member during the opening of the circuit to cause all of the rheostat resistance to be introduced into the circuit.

In testimony whereof, we have affixed our signatures to this specification.

MARTIN L. MARTUS.
EDMUND H. BECKER.
JAMES G. ROSS.